ates Patent [19] [11] 3,716,351
Kunkel et al. [45] Feb. 13, 1973

[54] ALGAECIDE COMPOSITION HAVING IMPROVED STABILITY

[76] Inventors: Donald H. Kunkel, Route No. 2 Box 9, Eagle; Donald E. Seymour, 2608 East Newton Avenue, Milwaukee, both of Wis.

[22] Filed: April 28, 1970

[21] Appl. No.: 32,780

[52] U.S. Cl. .................................71/67, 71/DIG. 1
[51] Int. Cl. ..............................................A01n 11/04
[58] Field of Search....................................71/67, 122

[56] References Cited

UNITED STATES PATENTS 2,734,028   2/1956   Domogalla ..............................71/67

OTHER PUBLICATIONS

Voine Sev et al. Chem. Abst. Vol. 67 (1967) 90004g.

*Primary Examiner*—Lewis Gotts
*Assistant Examiner*—Catherine L. Mills
*Attorney*—Andrus, Sceales, Starke & Sawall

[57] ABSTRACT

An algaecide composition having improved stability comprising an aqueous solution containing a complex which is a reaction product of either a copper salt or a cobalt salt with an alkanolamine. The solution also contains an effective amount of an acetylenic diol and an alkali metal halogenate, such as sodium chlorate, which aid in preventing the complex from decomposing during extended periods of storage.

8 Claims, No Drawings

ALGAECIDE COMPOSITION HAVING IMPROVED STABILITY

This invention relates to an algaecide composition and more particularly to an algaecide composition having improved stability.

Rivers, lakes, streams, drinking water supplies, irrigation systems, agricultural water systems, aquariums, fountains or ornamental water systems, fish ponds, swimming pools, shower rooms, and industrial water systems are frequently polluted by the excessive growth of algae and other microorganisms which impart a distasteful appearance and odor to the water, generally interfere with the flow of the water, and may be harmful to health. In the past a complex formed by the reaction of a copper salt and alkanolamine, as disclosed in United States Pat. No. 2,734,028, has been used and has achieved a wide success as an algaecide to destroy and control the growth of algae. A complex of this type has the ability to maintain the copper ions in solution and prevent formation of insoluble copper carbonates and hydroxides even in waters containing high proportions of carbonates, bicarbonates, or other dissolved solids.

A copper complex of this type is normally packaged in a concentrated form in glass, plastic or metal containers and is apt to be stored for extended periods. It has been found that when this complex is stored over long periods of time, and particularly when the containers may be subject to sunlight, decomposition of the complex may occur, resulting in a precipitation of the copper. Precipitation of the copper removes the toxic copper ions from solution and thus decreases the effectiveness of the complex when diluted and added to the water to be treated. In addition, precipitated copper can cause turbidity or cloudiness in the treated water, and as excessive amounts of copper settle out it can form a sludge or deposit, which is the case of a lake or stream, may tend to destroy the fish life or zooplankton which is essential as fish food.

The present invention is directed to an algaecide composition containing a copper or cobalt complex and having unexpected and improved effectiveness against algae and certain varieties of aquatic weeds, as well as having improved stability so that the complex will not decompose over extended periods of storage. The algaecide composition is an aqueous solution containing a complex formed by the reaction of either a copper or cobalt salt and an alkanolamine. The improved stability is brought about by the addition of an effective amount of an acetylenic diol and alkali metal halogenate.

The salt employed to form the complex can be any water soluble salt of copper or cobalt, such as the sulfate, chloride, bromide, acetate, nitrate, citrate, or the like.

The alkanolamine includes at least one alkanol group containing from one to 10 carbon atoms and may consist of monoethanolamine, diethanolamine, triethanolamine, dimethyl-ethanolamine, diethylethanolamine, aminoethylethanolamine, monoisopropanolamine, diisopropanolamine, triisopropanolamine, methyldiethanolamine, and the like. Of the above named compounds triethanolamine has been found to be a very economical and effective agent for use with water soluble copper salts because it requires a smaller amount of the triethanolamine than the other amines to keep the copper ions in solution, while mono-ethanolamine has been most effective with the cobalt salts. To form the complex, the alkanolamine is generally used in a weight ratio of 1 to 2 parts to one part of the copper or cobalt salt. The resulting complex ion will maintain the metal in solution in a variety of hard waters containing substantial concentrations of alkaline earth metal carbonates and bicarbonates. In addition, the salts or esters of the above alkanolamines can be employed with equal results. It is believed that the hydroxy groups aid in bringing about the formation of the soluble copper or cobalt complex.

The acetylenic diol has the following chemical structure:

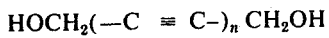

where $n$ is an integer of 1 or 2. Specific examples of acetylenic diols to be used are 2-butyne-1,4 diol ($HOCH_2C \equiv C\text{-}C H_2OH$) and 2,4,hexadiene-1,6 diol ($HOCH_2C \equiv C\text{—}C \equiv C CH_2OH$). Esters of the acetylenic diols can also be used.

The acetylenic diol or its esters is used in a weight ratio of 0.001:1 to 10:1 with respect to the complex, based on 100 percent active ingredients, and preferably in the weight ratio of 0.1:1 to 1:1.

The alkali metal halogenate, such as sodium or potassium chlorate or bromate, is employed in the weight ratio of 0.001:1 to 10:1 with respect to the complex, based on 100 percent active ingredients, and preferably in the weight ratio of 0.1:1 to 1:1.

The precise mechanism by which the acetylenic diol and alkali metal halogenate aid in increasing the stability of the complex is not completely understood, but the combination of these compounds prevents the breakdown of the complex and the resulting precipitation of copper or cobalt salts on the bottom and sides of the container.

It has also been found that the pH of the aqueous solution has an effect on the stability of the complex. The pH of the solution should be in the range of 5.0 to 12.0 and preferably in the range of 7.4 to 8.0 when using the copper complex, and in the range of 9.5 to 10.5 when dealing with the cobalt complex. If the pH is between 6.8 and 7.4, the complex will tend to decompose more rapidly. Thus, if the pH of the copper complex solution is in the range of 7.4 to 8.0 after mixing of the various constituents, the pH can be adjusted upwardly to the desired value by the addition of sodium hydroxide or any other conventional alkaline material, or can be adjusted downwardly by the addition of an acidic material.

The algaecide composition is generally packaged in concentrated form containing at least 50 percent, and preferably 50 to 80 percent by weight of the complex. This high concentration of solids not only aids in preventing decomposition of the complex but also provides economies in shipping and handling. At the location of use the algaecide composition is diluted in a ratio of 5 parts to 200 parts of water for each part of the concentrated algaecide composition. The dilute solution is then applied to the body of water such that the body of water contains about 0.25 to 20.0 ppm of the complex.

The use of the acetylenic diol and the alkali metal halogenate acts to prevent decomposition of the complex, so that the algaecide composition can be stored for extended periods in transparent containers.

By maintaining the copper or cobalt ions in solution over extended periods of storage a more effective use of the toxic metal ions is achieved and unesirable precipitation or deposits of the metal ions are minimized.

The algaecidal composition is effective against all common forms of algae, including filamentous algae, such as Cladaphora and Spirogyra, planktonic algae such as Anacystis and Anaebena, chara algae such as *Chara vulgaris* and Nitella and swimming pool -Algae such as black, brown and red algae. It has been found that the composition of the invention containing the acetylenic diol and the alkali metal halogenate has increased algaecidal effectiveness as compared to like concentrations of the complex alone.

In addition to its algaecidal effect, the composition, due to the addition of the acetylenic diol and the alkali metal halogenate, also tends to function as a defoliant or herbicide, depending on the concentration of the active ingredients, and has unexpected effectiveness against certain higher aquatic plants such as Hydrilla and Southern Niad.

With the use of the composition of the invention, the copper complex is more readily absorbed by the algae and aquatic weeds than other copper compounds used in prior art algaecides, with the result that the composition has increased effectiveness. In addition, the composition is extremely persistent in that the absorbed copper complex appears to be returned to the body of water after destruction of the algae or aquatic weeds so that an effective concentration of the complex is maintained in the water for extended periods.

As a further advantage, the composition of the invention has been found to have a beneficial effect on certain types of fish diseases, such as fin rot, Saprolegnia (white fungus), gill disease and whirling disease.

The following examples illustrate the preparation and use of the algeacide composition of the invention.

EXAMPLE NO. 1

700 gallons of a copper sulfate-triethanolamine complex were prepared by mixing 2,100 pounds of copper sulfate with 315 gallons of 85 percent commercial grade triethanolamine and 250 gallons of water. The resulting aqueous solution contained 72 percent by weight of the complex and the pH of the solution was adjusted to 7.5 by the addition of sodium hydroxide solution. One quart of a 35 percent aqueous solution of 2-butyne-1,4-diol and 2.09 pounds of sodium chlorate were added to 50 gallons of the copper complex solution and samples of this mixture were stored in transparent plastic containers. After a period of 12 weeks at room temperature, there was no visible deposit or precipitation in the containers and the solutions remained clear.

Control samples containing the same concentration of copper sulfate-triethanolamine complex, but without the addition of the acetylenic diol and sodium chlorate, were similarly stored at room temperature and after a 12 hour period a precipitate had formed on both the side walls and bottoms of all containers containing the control samples.

EXAMPLE NO. II 3 pounds of cobalt chloride and 2.2 pounds of monoethanolamine were added to 4.75 pounds of water. The resulting solution had a pH of 9.5 and it was adjusted to 10.0 by the addition of aqueous sodium hydroxide.

To 1 gallon of this cobalt complex solution were added 19 c.c. of a 35 percent aqueous solution of 2-butyne-1,4-diol and 19 gr. of sodium chlorate. Samples of the mixture were stored in transparent plastic containers. After a period of 12 weeks at room temperature, there was no visible deposit or precipitation in the containers and the solutions remained clear.

Control samples containing the same concentration of the cobalt complex, but without the addition of the acetylenic diol and sodium chlorate, were similarly stored at room temperature and after a 12 hour period a precipitate had formed on both the side walls and bottoms of all containers containing the control samples.

Various modes of carrying out the invention are contemplated as being within the scope of the following claims particularly pointing out and distinctly claiming the subject matter which is regarded as the invention.

We claim:

1. An algaecide composition having improved stability, consisting essentially of an aqueous solution containing an effective amount of a complex produced by reacting a water soluble metal salt selected from the group of copper salts and cobalt salts with an alkanolamine having at least one alkanol group containing from one to ten carbon atoms, said solution also having dissolved therein an acetylenic diol and an alkali metal halogenate to provide increased stability for the complex and prevent decomposition of the same and precipitation of metal salts, said acetylenic diol having the following structure:

where n is an integer of 1 or 2, said acetylenic diol being present in a weight concentration of 0.001:1 to 10:1 with respect to the complex, and said alkali metal halogenate being present in a weight concentration of 0.001:1 to 10:1 with respect to the complex.

2. The composition of claim 1, wherein said acetylenic diol is 2-butyne-1,4 diol.

3. The composition of claim 1, wherein said alkali metal halogenate is sodium chlorate.

4. The composition of claim 1, wherein said alkanolamine is used in a weight ratio of 1 to 2 parts per one part of the metal salt.

5. The composition of claim 1, wherein the aqueous solution has a pH in the range of 7.4 to 8.0 when utilizing the copper complex and a pH in the range of 9.5 to 10.5 when utilizing the cobalt complex.

6. A method of improving the stability of an aqueous algaecide composition containing an effective amount of a complex produced by reacting a water-soluble metal salt selected from the group consisting of copper salts and cobalt salts with an alkanolamine having at least one alkanol group containing from 1 to 10 carbon atoms, said method comprising the step of incorporating with said algae-cide composition an acetylenic diol and an alkali metal halogenate, said acetylenic diol having the following structure:

where $n$ is an integer of 1 or 2, said acetylenic diol being employed in a weight concentration of 0.001:1 to 10:1 with respect to the complex and said halogenate being employed in the weight concentration of 0.001:1 to 10:1 with respect to said complex.

7. The method of claim 6, wherein the complex is dissolved in an aqueous solution.

8. The method of claim 6, wherein the solution has a pH of 5.0 to 12.0.

* * * * *